United States Patent
Min et al.

(10) Patent No.: US 9,160,028 B2
(45) Date of Patent: Oct. 13, 2015

(54) DEVICE AND METHOD FOR STACKING UNITS FOR SECONDARY BATTERY

(71) Applicant: LG CHEM, LTD., Seoul (KR)

(72) Inventors: Ki Hong Min, Daejeon (KR); Seung Ho Na, Daejeon (KR); Jin Ho Ban, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/499,908

(22) Filed: Sep. 29, 2014

(65) Prior Publication Data

US 2015/0090389 A1    Apr. 2, 2015

Related U.S. Application Data

(63) Continuation of application No. PCT/KR2014/005021, filed on Jun. 5, 2014.

(30) Foreign Application Priority Data

Sep. 27, 2013   (KR) .......................... 10-2013-0115622

(51) Int. Cl.
  *H01M 10/058*   (2010.01)
  *H01M 10/04*    (2006.01)
  *H01M 2/16*     (2006.01)

(52) U.S. Cl.
  CPC .......... *H01M 10/0404* (2013.01); *H01M 2/168* (2013.01); *H01M 10/0468* (2013.01); *H01M 10/058* (2013.01); *H01M 10/0413* (2013.01); *H01M 10/0436* (2013.01)

(58) Field of Classification Search
  CPC .......................... H01M 10/0404; H01M 10/058

USPC .......................................................... 156/60
See application file for complete search history.

(56) References Cited

U.S. PATENT DOCUMENTS

| | | | |
|---|---|---|---|
| 4,993,895 A * | 2/1991 | Nordstrom | 408/103 |
| 6,279,815 B1 * | 8/2001 | Correia et al. | 228/180.21 |
| 7,384,705 B2 | 6/2008 | Kezuka | |
| 8,298,722 B2 | 10/2012 | Chou | |
| 8,945,744 B2 * | 2/2015 | Kwon et al. | 429/94 |

(Continued)

FOREIGN PATENT DOCUMENTS

| | | |
|---|---|---|
| EP | 2 696 428 A1 | 2/2014 |
| JP | 2005-50583 A | 2/2005 |

(Continued)

OTHER PUBLICATIONS

Supplementary Partial European Search Report dated Jul. 17, 2015.

*Primary Examiner* — Jeff Aftergut
(74) *Attorney, Agent, or Firm* — Birch, Stewart, Kolasch & Birch, LLP (57) ABSTRACT

Provided is a unit stacking device for a secondary battery, which stacks one or more first radical units having a first size and one or more second radical units having a second size greater than the first size and includes a stack jig, which includes a first inner space having a size corresponding to the first size and a second inner space disposed above the first inner space and communicating with the first inner space and having a size corresponding to the second size. The first radical units are stacked in the first inner space through the second inner space, and then, the second radical units are stacked in the second inner space.

18 Claims, 11 Drawing Sheets

(56) References Cited

U.S. PATENT DOCUMENTS

2007/0254199 A1    11/2007    Shu
2008/0044689 A1    2/2008    Shu
2012/0225345 A1    9/2012    Kim
2014/0134472 A1    5/2014    Kim

FOREIGN PATENT DOCUMENTS

| | | |
|---|---|---|
| JP | 2008-204706 A | 9/2008 |
| JP | 2011-233857 A | 11/2011 |
| JP | 2012-227129 A | 11/2012 |
| KR | 10-2008-0010005 A | 1/2008 |
| KR | 10-2012-0060702 A | 6/2012 |
| KR | 10-1163053 B1 | 7/2012 |
| TW | 499767 B | 8/2002 |
| TW | 200743245 | 11/2007 |
| TW | 200812138 A | 3/2008 |
| TW | I377731 B | 11/2012 |
| WO | WO 2012/137918 A1 | 10/2012 |

\* cited by examiner

Fig.14

DEVICE AND METHOD FOR STACKING UNITS FOR SECONDARY BATTERY

CROSS-REFERENCE TO RELATED APPLICATIONS

This application is a Continuation of PCT International Application No. PCT/KR2014/005021 filed on Jun. 5, 2014 which claims priority under 35 U.S.C. 119 a to Korean Patent Application No. 10-2013-0115622, filed in the Republic of Korea on Sep. 27, 2013, all of which are hereby expressly incorporated by reference into the present application.

BACKGROUND OF THE INVENTION

1. Field of the Invention

The present invention relates to a device and method for stacking units for a secondary battery, and more particularly, to a device and method for stacking units for a secondary battery which conveniently stacks a plurality of radical units having different sizes by using a stack jig.

2. Description of the Related Art

Secondary batteries may be variously classified according to structures of electrode assemblies. For example, secondary batteries may be classified into stack-type batteries, winding-type (jell-roll-type) batteries, and stack/folding-type batteries. An electrode assembly of stack-type batteries is formed by cutting cathodes, separators, and anodes to a predetermined size and then stacking the cathodes, the separators, and the anodes. The separators are disposed between the cathodes and the anodes, respectively. An electrode assembly of winding-type batteries is formed by forming a cathode, a separator, an anode, and a separator into sheet shapes, then, sequentially stacking the cathode, the separator, the anode, and the separator, and then, winding the cathode, the separator, the anode, and the separator. An electrode assembly of stack/folding-type batteries is formed by forming full-cells or bi-cells and then winding the full-cells or the bi-cells with a separator sheet. The full-cells or the bi-cells may be formed by cutting a cathode, a separator, and an anode to a predetermined size and then sequentially stacking the cathode, the separator, and the anode (each of the full-cells or the bi-cells includes one or more cathodes, one or more separators, and one or more anodes).

A detailed description of an electrode assembly having a stack-type structure is disclosed in Korean Patent Registration No. 10-1163053, which was filed by the applicant of the present invention.

Recent electrode assemblies have a stacked structure formed in a stepped manner to be installed in a miniaturized product.

Figure 1:
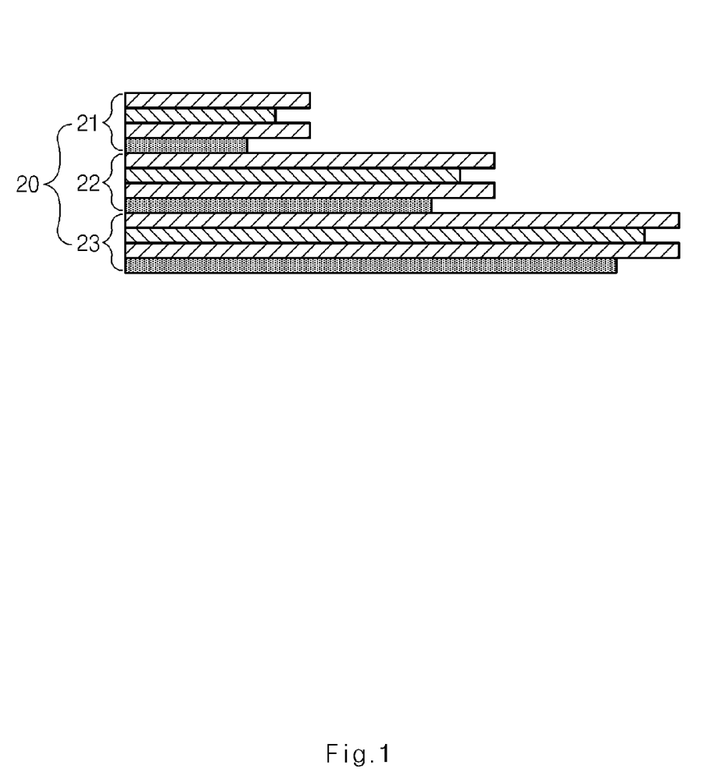
FIG. 1 is a cross-sectional view illustrating an electrode assembly having a stacked structure formed in a stepped manner in the related art.

In particular, referring to FIG. 1, a related art stack-type electrode assembly 20 having a stacked structure formed in a stepped manner includes: one or more first radical units 21 having a first size; one or more second radical units 22 having a second size greater than the first size, wherein the first radical units 21 are stacked on the second radical units 22; and one or more third radical units 23 having a third size greater than the second size, wherein the second radical units 22 are stacked on the third radical units 23.

However, when the first to third radical units 21, 22, and 23 of the stack-type electrode assembly 20 are stacked, it is difficult to precisely position the first to third radical units 21, 22, and 23. Furthermore, the first and second radical units 21 and 22 may be moved to cause a defect. To address these problems, stacking positions of the first to third radical units 21, 22, and 23 are adjusted through a separate process.

SUMMARY OF THE INVENTION

Accordingly, the present invention aims at providing a device and method for stacking units for a secondary battery, which stacks a plurality of units having different sizes by using a stack jig, so as to increase work efficiency and productivity.

According to an aspect of the present invention, there is provided a unit stacking device for a secondary battery, which stacks one or more first radical units having a first size and one or more second radical units having a second size greater than the first size and includes a stack jig, which includes a first inner space having a size corresponding to the first size and a second inner space disposed above the first inner space and communicating with the first inner space and having a size corresponding to the second size, wherein the first radical units are stacked in the first inner space through the second inner space, and then, the second radical units are stacked in the second inner space.

The unit stacking device may further include a radical unit aligning part which classifies the first and second radical units according to sizes thereof, then, stacks the first and second radical units, and then, aligns the first and second radical units.

The radical unit aligning part may include: a fixing body which supports a side surface of the first and second radical units or two neighboring surfaces of the first and second radical units; and a pressing body which presses side surfaces of the first and second radical units, except for the surfaces supported by the fixing body.

The unit stacking device may further include a radical unit transferring part which transfers the first and second radical units aligned according to the sizes thereof by the radical unit aligning part, to the stack jig.

A side inner surface of the first inner space may be vertically extended from a side inner surface of the second inner space.

A cut hole may be disposed in a side surface of the stack jig and be cut from an upper surface of the stack jig to a lower surface thereof in a height direction thereof to communicate with the first and second inner spaces.

The first and second radical units may have a four-layer structure in which a first electrode, a first separator, a second electrode, and a second separator are sequentially stacked.

The first and second radical units may be formed by adhering the first electrode, the first separator, the second electrode, and the second separator to one another.

The first electrode, the first separator, the second electrode, and the second separator may be adhered to one another by pressing the first electrode, the first separator, the second electrode, and the second separator, or by pressing and heating the first electrode, the first separator, the second electrode, and the second separator.

Surfaces of the first and second separators may be coated with a coating material having adhesive force.

The coating material may include a mixture of inorganic particles and a binder polymer.

The first and second radical units may be formed by repeatedly stacking the four-layer structure.

According to another aspect of the present invention, there is provided a stacking method using a unit stacking device for a secondary battery, including: individually manufacturing one or more first radical units having a first size and one or more second radical units having a second size greater than the first size; and stacking the first and second radical units by inserting the first and second radical units into a stack jig, wherein the stack jig includes a first inner space having a size corresponding to the first size and a second inner space disposed above the first inner space and communicating with the first inner space and having a size corresponding to the second size, and the first radical units are stacked in the first inner space through the second inner space, and then, the second radical units are stacked in the second inner space.

The method may further include classifying the first and second radical units according to sizes thereof, then, stacking the first and second radical units, and then, aligning the first and second radical units.

The first and second radical units may be aligned by supporting a side surface of the first and second radical units or two neighboring surfaces of the first and second radical units against a fixing body, and then, pressing side surfaces of the first and second radical units, except for the surfaces supported against the fixing body, by using a pressing body.

The method may further include transferring the first and second radical units aligned according to the sizes thereof, to the stack jig.

A side inner surface of the first inner space may be vertically extended from a side inner surface of the second inner space.

The method may further include attaching a fixing tape to the first and second radical units stacked in the stack jig, through a cut hole disposed in a side surface of the stack jig and cut from an upper surface of the stack jig to a lower surface thereof in a height direction thereof.

The first and second radical units may be manufactured to have a four-layer structure in which a first electrode, a first separator, a second electrode, and a second separator are sequentially stacked.

The first and second radical units may be manufactured by adhering the first electrode, the first separator, the second electrode, and the second separator to one another.

The first and second radical units may be manufactured by adhering the first electrode, the first separator, the second electrode, and the second separator to one another through laminating.

Surfaces of the first and second separators may be coated with a coating material having adhesive force, and the coating material may include a mixture of inorganic particles and a binder polymer.

The first and second radical units may be manufactured by repeatedly stacking the four-layer structure.

According to the present invention, a plurality of radical units having different sizes are inserted into a stack jig and are stacked, thereby increasing work efficiency and productivity.

DETAILED DESCRIPTION OF THE EXEMPLARY EMBODIMENT

A unit stacking device for a secondary battery according to the present invention inserts a plurality of radical units having different sizes into a stack jig to conveniently stack the radical units in a stepped manner, thereby increasing work efficiency and productivity.

Hereinafter, embodiments of the present invention will be described in detail with reference to the accompanying drawings such that those skilled in the art to which the present invention belongs can realize the present invention without difficulty. The present invention may, however, be embodied in different forms and should not be construed as limited to the embodiments set forth herein. In the drawings, anything unnecessary for describing the present invention will be omitted for clarity. Like reference numerals denote like elements throughout.

A configuration for stacking one or more first radical units having a first size and one or more second radical units having a second size greater than the first size will be described according to an embodiment of the present invention, and a plurality of radical units having different sizes may be stacked using a stack jig.

[Electrode Assembly According to the Present Invention]

Figure 2:
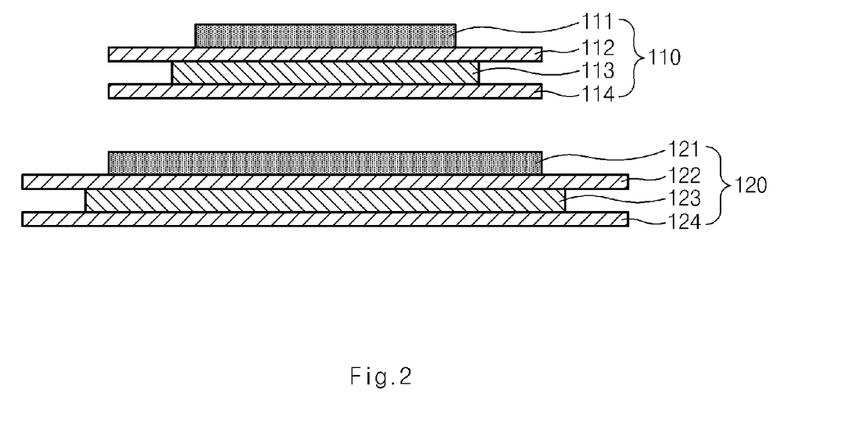
FIG. 2 is a cross-sectional view illustrating a first structure of an electrode assembly according to the present invention.
Figure 3:
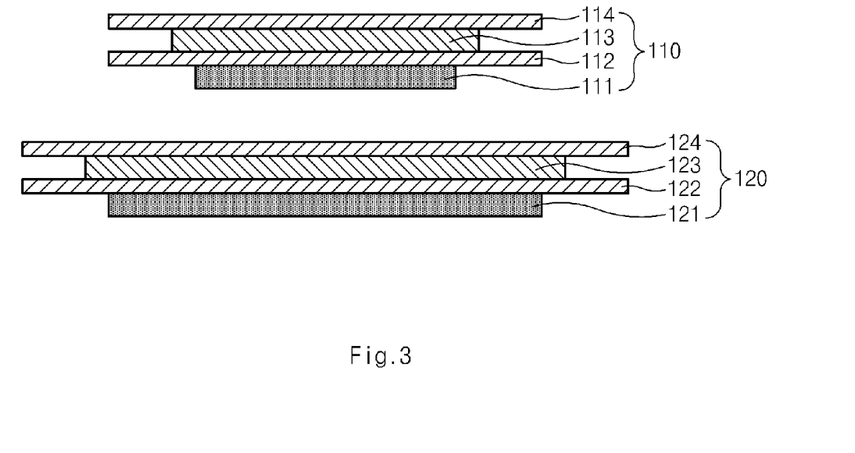
FIG. 3 is a cross-sectional view illustrating a second structure of an electrode assembly according to the present invention.

Referring to FIGS. 2 and 3, an electrode assembly 100 according to the present invention includes one or more first radical units 110 having a first size and a second radical unit 120 having a second size greater than the first size. The first and second radical units 110 and 120 are stacked in a stepped manner by a unit stacking device 200 for a secondary battery.

The first and second radical units 110 and 120 basically have a four-layer structure in which a first electrode, a first separator, a second electrode, and a second separator are sequentially stacked.

In particular, referring to FIG. 2, the first radical unit 110 may have the first size and be formed by sequentially stacking a first electrode 111, a first separator 112, a second electrode 113, and a second separator 114 from the upper side of the first radical unit 110 to the lower side thereof. Alternatively, referring to FIG. 3, the first electrode 111, the first separator 112, the second electrode 113, and the second separator 114 may be sequentially stacked from the lower side of the first radical unit 110 to the upper side thereof. The pole of the first electrode 111 is opposite to that of the second electrode 113. For example, when the first electrode 111 is a cathode, the second electrode 113 may be an anode, and vice versa.

Referring to FIG. 2, the second radical unit 120 may have the second size greater than the first size of the first radical unit 110 and be formed by sequentially stacking a first electrode 121, a first separator 122, a second electrode 123, and a second separator 124 from the upper side of the second radical unit 120 to the lower side thereof. Alternatively, referring to FIG. 3, the first electrode 121, the first separator 122, the second electrode 123, and the second separator 124 may be sequentially stacked from the lower side of the second radical unit 120 to the upper side thereof. The pole of the first electrode 121 is opposite to that of the second electrode 123. For example, when the first electrode 121 is a cathode, the second electrode 123 may be an anode, and vice versa.

When the first and second radical units 110 and 120 are stacked, opposite electrodes are disposed with a separator therebetween. For example, the first and second radical units 110 and 120 are stacked such that the first electrode 111, the first separator 112, the second electrode 113, the second separator 114, the first electrode 121, the first separator 122, the second electrode 123, and the second separator 124 are sequentially disposed.

Although one first radical unit and one second radical unit are exemplified in FIGS. 2 and 3, a plurality of first radical units and a plurality of second radical units may be stacked. In addition, a cathode, an anode, and a separator have different sizes, and the separator have the greatest size for electrical insulation. Thus, the size of the radical units set forth in the present specification is based on the size of the separators thereof (if other elements are greater than the separators, the size of the radical units may be based on the size of the elements).

Figure 4:
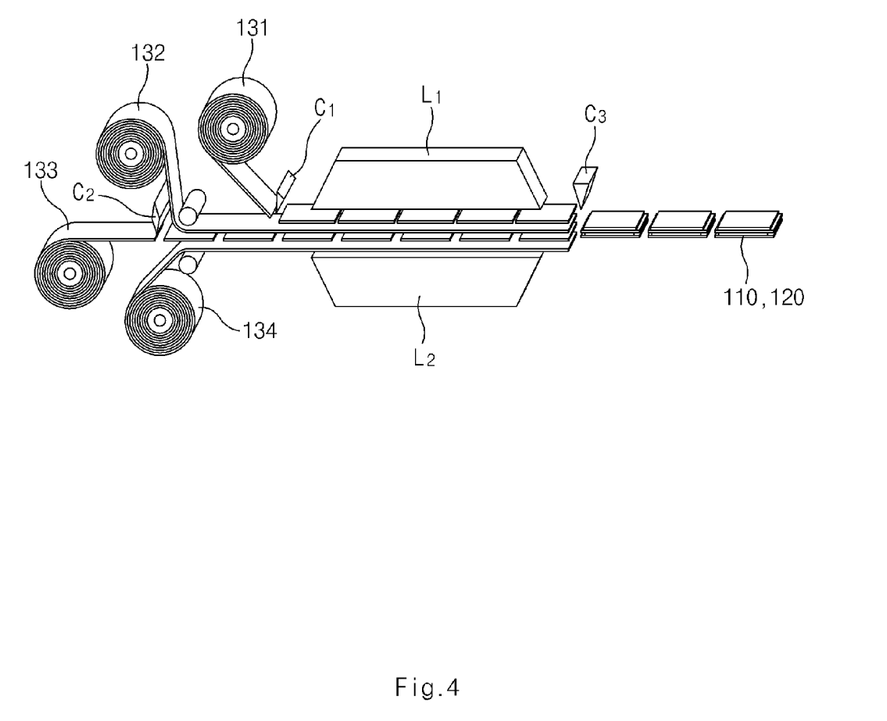
FIG. 4 is a schematic view illustrating a process of manufacturing an electrode assembly according to the present invention.

A radical unit having such a stacked structure may be formed through the following processes (refer to FIG. 4).

First, a first electrode raw material 131, a first separator raw material 132, a second electrode raw material 133, and a second separator raw material 134 are prepared for the first radical unit 110. The first and second electrode raw materials 131 and 133 are cut to predetermined sizes to form the first and second electrodes 111 and 113, which will be described later. Such a manner is applied to the first and second separator raw materials 132 and 134. Electrode raw materials and separator raw materials may be wound around rolls for process automation. After the first electrode raw material 131, the first separator raw material 132, the second electrode raw material 133, and the second separator raw material 134 are prepared, the first electrode raw material 131 is cut to the predetermined size using a cutter C1. The second electrode raw material 133 is also cut to the predetermined size using a cutter C2. After that, the first electrode raw material 131 having the predetermined size is supplied onto the first separator raw material 132. The second electrode raw material 133 having the predetermined size is supplied onto the second separator raw material 134. After that, the first electrode raw material 131, the first separator raw material 132, the second electrode raw material 133, and the second separator raw material 134 are supplied together to laminators L1 and L2.

Accordingly, the first radical unit 110 is formed. Such a first radical unit may be provided in plurality and be stacked. If the first electrode 111, the first separator 112, the second electrode 113, and the second separator 114, which constitute the first radical units 110, are separated from one another, it is significantly different to repeatedly stack the first radical units 110. Thus, when the first radical unit 110 is formed, the first electrode 111, the first separator 112, the second electrode 113, and the second separator 114 may be adhered to one another. As such, referring to FIG. 4, the laminators L1 and L2 are used to adhere electrodes and separators to one another. That is, the laminators L1 and L2 press electrode raw materials and separator raw materials, or heat and press the electrode raw materials and the separator raw materials to adhere the electrode raw materials and the separator raw materials to one another. As such, electrode raw materials and separator raw materials are adhered to one another by the laminators L1 and L2. Such an adhering process makes the first radical unit 110 more stably maintain the shape thereof.

Finally, the first separator raw material 132 and the second separator raw material 134 are cut together to the first size using a cutter C3. Accordingly, the first radical unit 110 may be formed. Additionally, various inspections may be optionally performed on the first radical unit 110. For example, a thickness inspection, a vision inspection, and a short circuit inspection may be additionally performed.

A surface of a separator (a separator raw material) may be coated with a coating material having adhesive force. The coating material may be a mixture of inorganic particles and a binder polymer. The inorganic particles may improve thermal stability of the separator. That is, the inorganic particles may prevent the separator from contracting at a high temperature. The binder polymer may fix the inorganic particles. The inorganic particles may form a predetermined porous structure in a coating layer formed on the surface of the separator. Although the separator is coated with the inorganic particles, ions may efficiently move from a cathode to an anode through the porous structure. The binder polymer stably fixes the inorganic particles to the separator to improve mechanical stability of the separator. Furthermore, the binder polymer may more stably adhere the separator to an electrode (which is called safety-reinforcing separator (SRS) coating). For reference, the separator may be formed of a polyolefin-based separator base material.

Referring to FIGS. 2 and 3, the first and second electrodes 111 and 113 are disposed on both side surfaces of the first separator 112, and the second electrode 113 is disposed on a surface of the second separator 114. Thus, both the surfaces of the first separator 112 may be coated with a coating material, and only the surface of the second separator 114 may be coated with a coating material. That is, both the surfaces of the first separator 112, which face the first and second electrodes 111 and 113, may be coated with a coating material, and only the surface of the second separator 114, which face the second electrode 113, may be coated with a coating material.

As such, an adhering process using coating materials may be performed on only the inside of a racial unit. Thus, only one surface of the second separator 114 may be coated as described above. However, both surfaces of the second separator 114 may also be optionally coated since a plurality of the first radical units 110 may be adhered to each other using a method such as heat press, or the first radical unit 110 and the second radical unit 120 may be adhered to each other using a method such as the heat press. That is, the surface of the second separator 114 facing the second electrode 113, and the opposite surface of the second separator 114 thereto may be coated with a coating material. In this case, the first radical unit 110 disposed at the upper side of the second separator 114 may be adhered to the second radical unit 120 disposed directly under the first radical unit 110 by the coating material formed on both the surfaces of the second separator 114.

For reference, when a coating material having adhesive force is applied to a separator, it may be undesirable that a predetermined element directly presses the separator. The separator may be extended outward to be longer than electrodes. Thus, a distal end of the first separator 112 may be coupled to a distal end of the second separator 114. For example, a distal end of the first separator 112 may be welded to a distal end of the second separator 114 through ultrasonic welding. Such ultrasonic welding requires direct pressing an object with a horn. However, as such, when a horn directly presses a distal end of a separator, the horn may be adhered to the separator by a coating material having adhesive force, which may cause device trouble. Thus, when a coating material having adhesive force is applied to a separator, a process of directly pressing the separator with a predetermined element may be undesirable.

Additionally, the first radical unit 110 may not have the four-layer structure. For example, the first radical unit 110 may have an eight-layer structure formed by sequentially stacking the first electrode 111, the first separator 112, the second electrode 113, the second separator 114, the first electrode 111, the first separator 112, the second electrode 113, and the second separator 114. That is, the first radical unit 110 may have a structure formed by repeatedly stacking the four-layer structure.

Forming the second radical unit 120 is the same as the above described forming of the first radical unit 110, except that the second size of the second radical unit 120 is greater than the first size of the first radical unit 110.

Thus, the same description of the forming of the second radical unit 120 as that of the forming of the first radical unit 110 will be omitted.

[Unit Stacking Device for Secondary Battery According to the Present Invention]

Figure 5:
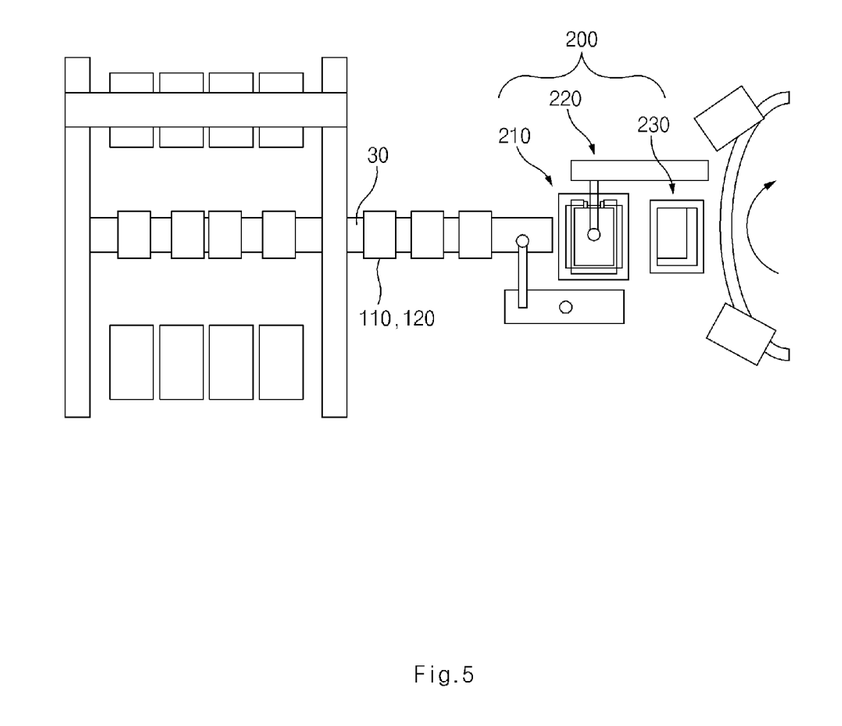
FIG. 5 is a schematic view illustrating a unit stacking device for a secondary battery according to the present invention.

Referring to FIG. 5, the first and second radical units 110 and 120 manufactured as described above are transferred to the unit stacking device 200 for a secondary battery by a vacuum conveyor 30.

The unit stacking device 200 stacks a plurality of radical units having different sizes in a stepped manner such that the radical units are stacked sequentially from the smallest size to the greatest size through an insertion process, without separate position adjustment.

That is, referring to FIGS. 5 to 9, the unit stacking device 200 includes: a radical unit aligning part 210 which classifies the first and second radical units 110 and 120 according to the sizes thereof, then, stacks the first and second radical units 110 and 120, and then, aligns the first and second radical units 110 and 120; and a stack jig 230 in which the aligned first and second radical units 110 and 120 are inserted sequentially from the smallest size to the greatest size and are stacked.

Figure 6:
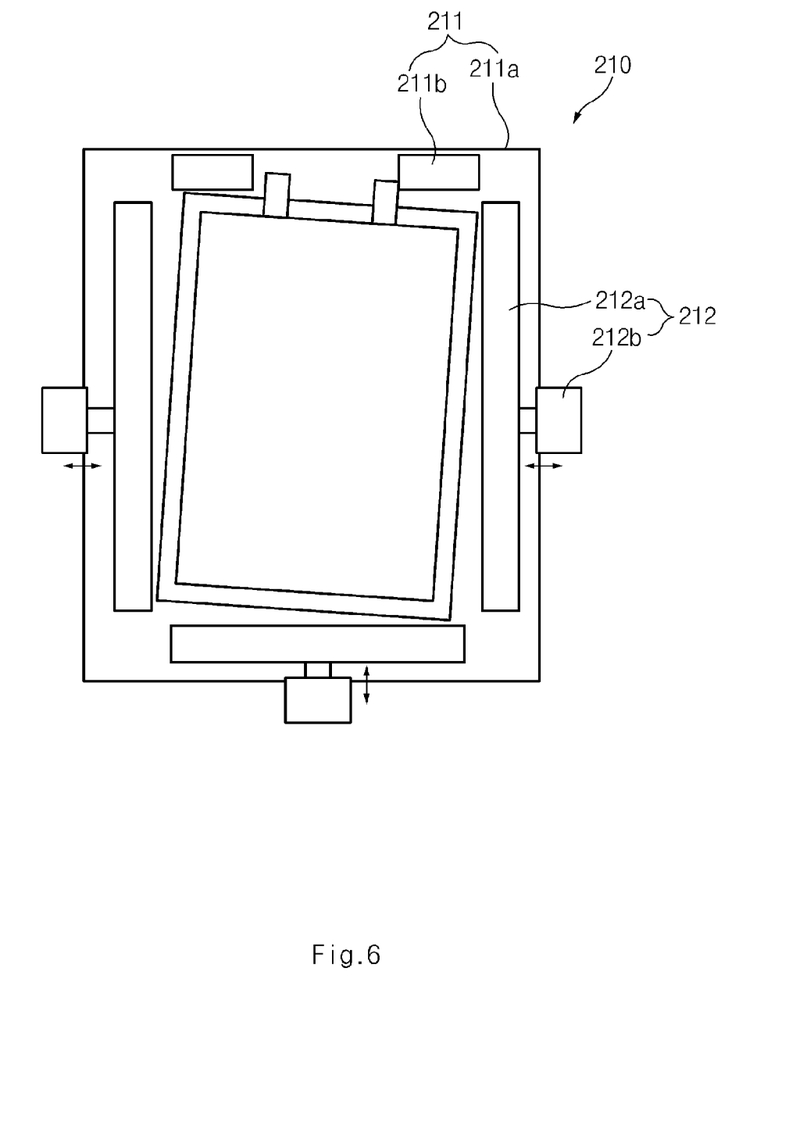
FIG. 6 is a schematic view illustrating a radical unit aligning part of a unit stacking device for a secondary battery according to the present invention.
Figure 7:
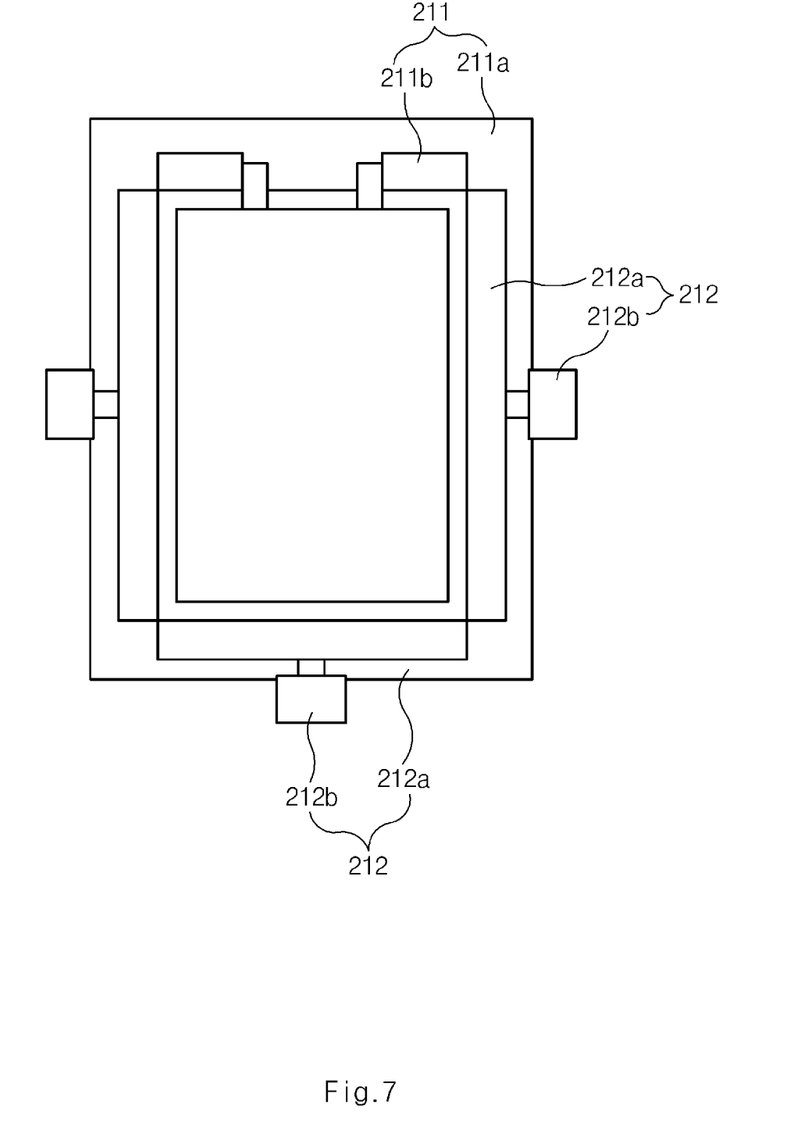
FIG. 7 is a schematic view illustrating a usage state of a radical unit aligning part of a unit stacking device for a secondary battery according to the present invention.

Referring to FIGS. 6 and 7, the radical unit aligning part 210 includes: a fixing body 211 which supports a side surface of the first and second radical units 110 and 120 or two neighboring surfaces of the first and second radical units 110 and 120; and a pressing body 212 which presses side surfaces of the first and second radical units 110 and 120, except for the surfaces supported by the fixing body 211.

The fixing body 211 includes: a main body 211*a* on which the first and second radical units 110 and 120 are disposed; and a supporting member 211*b* which supports the side surface or the two neighboring side surfaces of the first and second radical units 110 and 120 disposed on the main body 211*a*.

The pressing body 212 includes: a pressing member 212*a* which is provided on a side part of the main body 211*a* out of the supporting member 211*b* and presses the side surfaces of the first and second radical units 110 and 120, except for the surfaces supported by the fixing body 211; and a progressing device 212*b* which moves the pressing member 212*a* forward to press the side surfaces of the first and second radical units 110 and 120.

The radical unit aligning part 210 disposes the first and second radical units 110 and 120 on the main body 211*a* of the fixing body 211, and then, supports the first and second radical units 110 and 120 against the supporting member 211*b* (refer to FIG. 6). After that, the radical unit aligning part 210 operates the progressing device 212*b* of the pressing body 212 to move the pressing member 212*a* forward. Accordingly, the pressing member 212*a* presses the side surfaces of the first and second radical units 110 and 120, except for the surfaces supported by the fixing body 211, to align the first and second radical units 110 and 120 (refer to FIG. 7).

Thus, the radical unit aligning part 210 aligns the first and second radical units 110 and 120 to the same angle and position. Accordingly, when the first and second radical units 110 and 120 are inserted into the stack jig 230, the first and second radical units 110 and 120 are disposed in an accurate position.

When two or more of pressing bodies 212 are provided on the fixing body 211, the pressing bodies 212 are set to be simultaneously operated, thereby aligning the first and second radical units 110 and 120 more quickly and accurately.

The pressing body 212 may further include a spring between the pressing member 212*a* and the progressing device 212*b*. The pressing member 212*a* moved forward by the progressing device 212*b* elastically presses the first and second radical units 110 and 120 through the spring, thereby preventing defects of the first and second radical units 110 and 120, such as damage thereto or folding thereof.

For example, a plurality of first radical units may be aligned by the radical unit aligning part 210 and be then transferred to the stack jig 230 to be described later, and then, a plurality of second radical units may be aligned and be then transferred to the stack jig 230.

A radical unit transferring part 220 may be provided to transfer the first and second radical units 110 and 120 aligned according to the sizes thereof by the radical unit aligning part 210, to the stack jig 230.

Referring to FIG. 5, the radical unit transferring part 220 suctions the aligned first and second radical units 110 and 120 by using vacuum suction force, and then, transfers the first and second radical units 110 and 120 to the stack jig 230. Then, the vacuum suction force is removed, the first and second radical units 110 and 120 are vertically dropped and inserted into the stack jig 230.

For example, the radical unit transferring part 220 may use a robot arm having vacuum suction force to stably transfer the first and second radical units 110 and 120 aligned by the radical unit aligning part 210, to the stack jig 230.

The robot arm having vacuum suction force is widely used in industrial sites, and thus, a detailed description thereof will be omitted.

Figure 8:
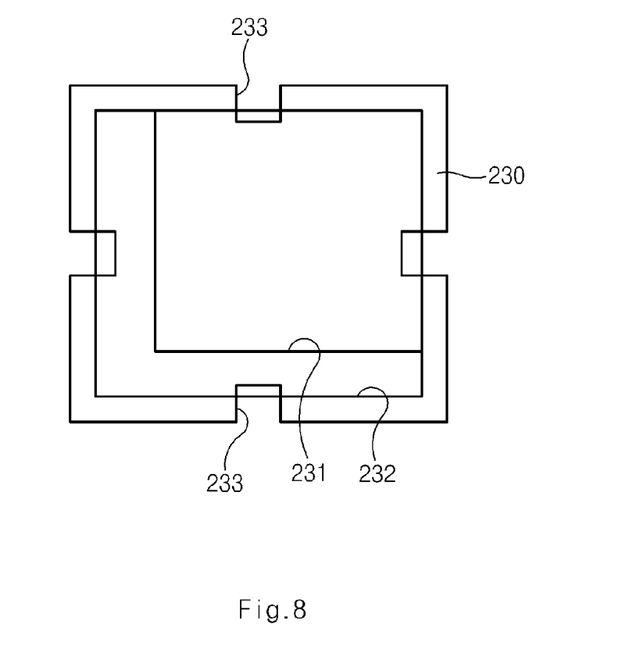
FIG. 8 is a plan view illustrating a stack jig of a unit stacking device for a secondary battery according to the present invention.
Figure 9:
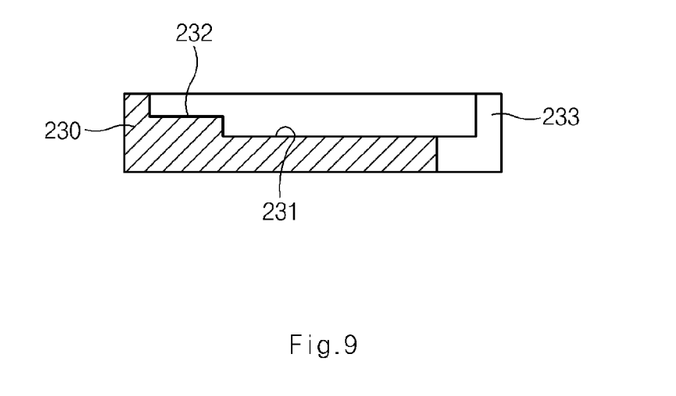
FIG. 9 is a cross-sectional view illustrating a stack jig of a unit stacking device for a secondary battery according to the present invention.

Referring to FIGS. 8 and 9, the stack jig 230 is used to stack one or more of the first radical units 110 having the first size and one or more of the second radical units 120 having the second size greater than the first size in a stepped manner, and includes a first inner space 231 having a size corresponding to the first size, and a second inner space 232 disposed above the first inner space 231 and communicating with the first inner space 231 and having a size corresponding to the second size.

That is, the stack jig 230 may conveniently stack the first and second radical units 110 and 120 in a stepped manner through the first inner space 231 and the second inner space 232.

A side inner surface of the first inner space 231 may be vertically extended from a side inner surface of the second inner space 232. That is, referring to FIG. 9, the side inner surfaces of the first and second inner spaces 231 and 232, which correspond to each other, may be extended in a vertical straight line shape, so that a surface of the first radical unit 110 and a surface of the second radical unit 120 can be aligned in the same line.

A cut hole 233 may be disposed in a side surface of the stack jig 230 and be cut from an upper surface of the stack jig 230 to a lower surface thereof in a height direction thereof to communicate with the first and second inner spaces 231 and 232. A plurality of cut holes 233 may be formed in side surfaces of the stack jig 230.

That is, a fixing tape 240 may be attached through the cut hole 233 to the first and second radical units 110 and 120 stacked in the first and second inner spaces 231 and 232, to immobilize and fix the stacked first and second radical units 110 and 120.

The unit stacking device 200 configured as described above may use the radical unit aligning part 210, the radical unit transferring part 220, and the stack jig 230 to conveniently stack the first radical unit 110 having the first size and the second radical unit 120 having the second size greater than the first size, thereby increasing work efficiency and productivity.

[Method of Stacking Units for Secondary Battery According to the Present Invention]

A stacking method using the unit stacking device 200 will now be described according to the present invention.

Figure 10:
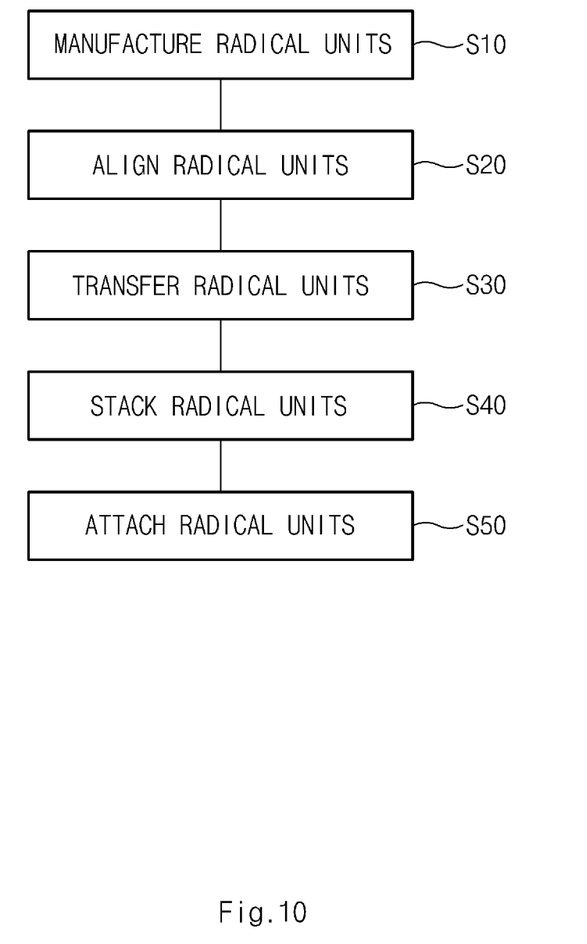
FIG. 10 is a flowchart illustrating a method of stacking units for a secondary battery according to the present invention.

Referring to FIG. 10, a method of stacking units for a secondary battery according to the present invention includes: individually manufacturing one or more of the first radical units 110 having the first size and one or more of the second radical units 120 having the second size greater than the first size (S10); and stacking the first radical unit 110 and the second radical unit 120 in a stack jig (S40).

The first and second radical units 110 and 120 may be classified according to the sizes thereof, be then stacked, and be then aligned (S20) and be then transferred to the stack jig (S30) between the manufacturing of the first and second radical units 110 and 120 (S10) and the stacking of the first and second radical units 110 and 120 (S40).

Hereinafter, the method of stacking units for a secondary battery will now be described in more detail according to an embodiment of the present invention.

Referring to FIGS. 2 and 3, the first and second radical units 110 and 120 are manufactured into a four-layer structure in which a first electrode, a first separator, a second electrode, and a second separator are sequentially stacked (S10).

The manufacturing of the first and second radical units 110 and 120 is previously set forth in detail in the description of the unit stacking device for a secondary battery, and thus, a detailed description thereof will be omitted.

When the first and second radical units 110 and 120 are manufactured (S10), the electrodes and the separators are adhered to one another, so as to maintain the shapes of the first and second radical units 110 and 120 more stably.

For example, referring to FIG. 4, the first and second radical units 110 and 120 may be formed (S10) by adhering the electrodes and the separators to one another by means of the laminators L1 and L2.

Surfaces of the first and second separators of the first and second radical units 110 and 120 are coated with a coating material having adhesive force, so that the first and second separators can be adhered to each other without using a separate adhesive material.

For example, the coating material formed on the first and second separators is a mixture of inorganic particles and a binder polymer. Thus, when the first and second separators are brought into tight contact with each other and are heated, the binder polymer are melted to adhere the first and second separators to each other.

The first and second radical units 110 and 120 are manufactured by repeatedly stacking the four-layer structure (S10), and the manufactured first and second radical units 110 and 120 are aligned using the radical unit aligning part 210 (S20).

The radical unit aligning part 210 is previously set forth in detail in the description of the unit stacking device for a secondary battery, and thus, a detailed description thereof will be omitted.

A side surface of the first and second radical units 110 and 120 or two neighboring surfaces of the first and second radical units 110 and 120 are supported against the fixing body 211 as illustrated in FIG. 6, and then, side surfaces of the first and second radical units 110 and 120, except for the surfaces supported against the fixing body 211, are pressed using the pressing body 212 to align the first and second radical units 110 and 120 as illustrated in FIG. 7 (S20).

If the first and second radical units 110 and 120 are inserted into the stack jig 230 without the aligning thereof, the first and second radical units 110 and 120 may be caught by an undesirable space and may not be inserted into accurate insertion spaces, which may cause stacking failure. Thus, in this case, a process in which a worker frequently checks and corrects stacking failure may be added.

Hence, before the stacking of the first and second radical units 110 and 120 (S40), the first and second radical units 110 and 120 are aligned to have a predetermined angle (S20), so that the first and second radical units 110 and 120 can be inserted into an accurate position of the stack jig 230 and be stacked.

When the aligning of the first and second radical units 110 and 120 is completed, the first and second radical units 110 and 120 aligned according to the sizes thereof are transferred to the stack jig 230 by the radical unit transferring part 220 (S30).

The radical unit transferring part 220 is previously set forth in detail in the description of the unit stacking device for a secondary battery, and thus, a detailed description thereof will be omitted.

Referring to FIG. 5, the radical unit transferring part 220 holds the aligned first radical unit 110 with vacuum suction force, and then, transfers the first radical unit 110 to the stack jig 230 to remove the vacuum suction force, thereby dropping the first radical unit 110 to the upper surface of the stack jig 230 (S30).

After that, the aligned second radical unit 120 is held with vacuum suction force and is then transferred to the stack jig 230 to remove the vacuum suction force, thereby dropping the second radical unit 120 to the upper surface of the stack jig 230.

The first and second radical units 110 and 120, which are sequentially transferred (S30), are inserted into the stack jig 230 and are stacked (S40).

The stack jig 230 includes the first inner space 231 having a size corresponding to the first size of the first radical unit 110, and the second inner space 232 disposed above the first inner space 231 and communicating with the first inner space 231 and having a size corresponding to the second size of the second radical unit 120.

The stack jig 230 is previously set forth in detail in the description of the unit stacking device for a secondary battery, and thus, a detailed description thereof will be omitted.

Figure 11:
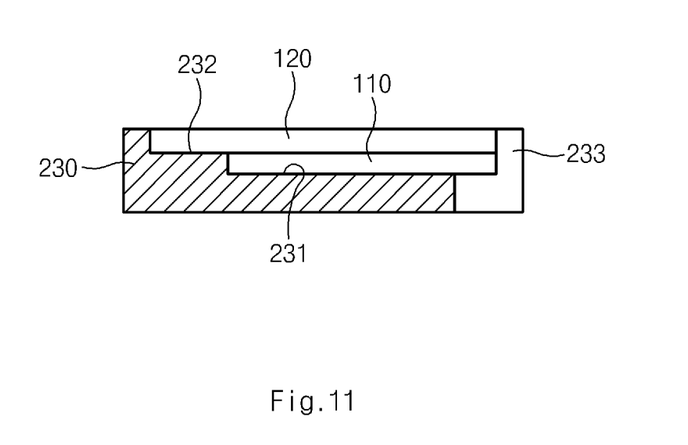
FIG. 11 is a cross-sectional view illustrating stacking of radical units in a method of stacking units for a secondary battery according to the present invention.

Referring to FIG. 11, the first radical unit 110 transferred by the radical unit transferring part 220 is placed in the first inner space 231 through the second inner space 232, and then, the second radical unit 120 transferred by the radical unit transferring part 220 is placed in the second inner space 232 (S40).

When the stacking of the first and second radical units 110 and 120 is completed (S40), the first and second radical units 110 and 120 stacked in the stack jig 230 may be fixed (S50).

Figure 12:
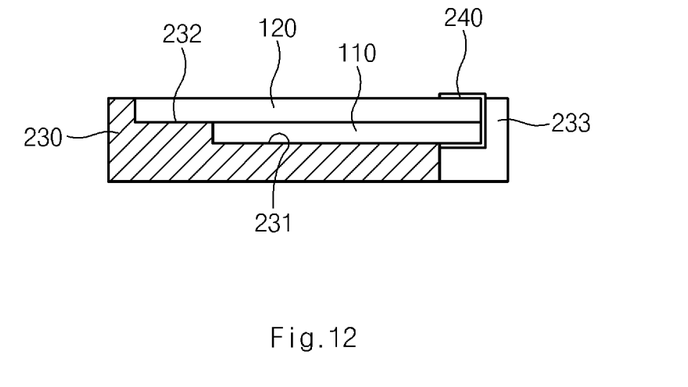
FIG. 12 is a cross-sectional view illustrating attaching of radical units in a method of stacking units for a secondary battery according to the present invention.

Referring to FIG. 12, the fixing tape 240 is attached through the cut hole 233 of the stack jig 230 to the first and second radical units 110 and 120 stacked in the stack jig 230 and connects an upper surface of the first and second radical units 110 and 120 to a lower surface thereof, so as to fix the first and second radical units 110 and 120 and prevent separation thereof (S50).

Figure 13:
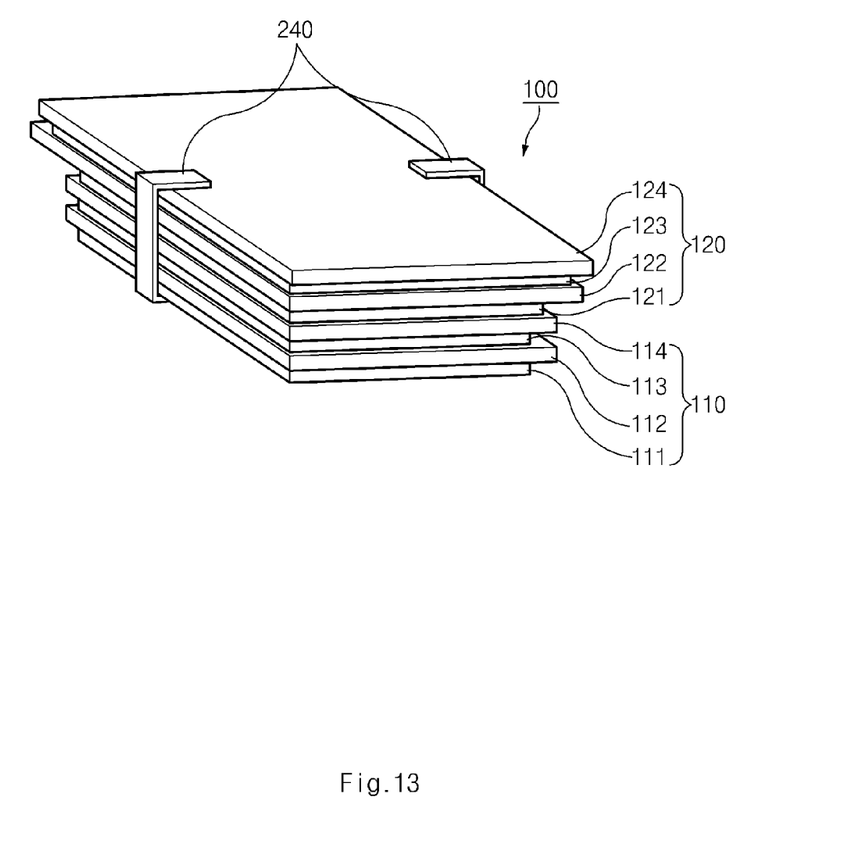
FIG. 13 is a schematic view illustrating an electrode assembly having a stacked structure formed using a method of stacking units for a secondary battery according to the present invention.

Referring to FIG. 13, when the attaching of the fixing tape 240 is completed (S50), the electrode assembly 100 in which the first and second radical units 110 and 120 are stacked in a stepped manner may be manufactured.

Hereinafter, another embodiment of the present invention will now be described. When a part of the current embodiment is the same as that of the previous embodiments, in terms of configuration and function, the part of the current embodiment uses the same reference numerals as those of the previous embodiments, and a description thereof will be omitted.

Figure 14:
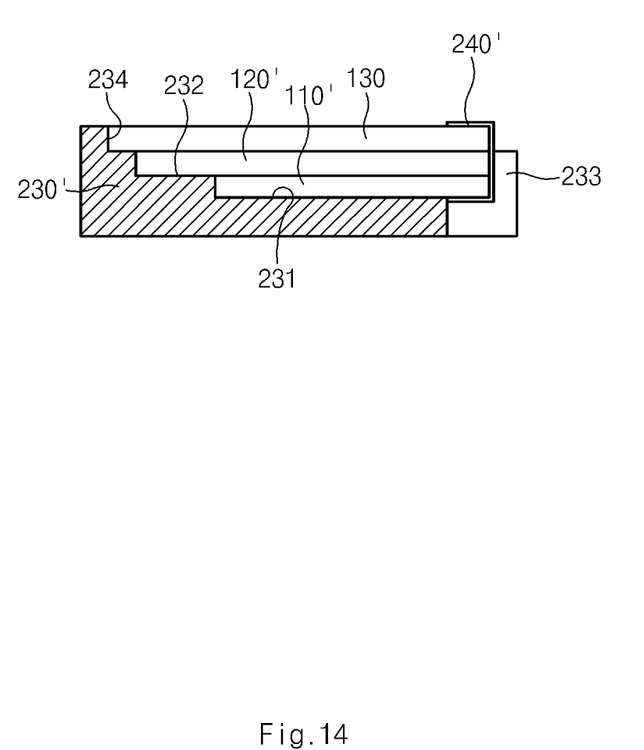
FIG. 14 is a cross-sectional view illustrating a unit stacking device for a secondary battery according to the present invention.

FIG. 14 is a cross-sectional view illustrating a unit stacking device for a secondary battery according to another embodiment of the present invention.

The unit stacking device according to the current embodiment may manufacture an electrode assembly having a structure of n or more steps by stacking n or more radical units having different sizes by means of a stack jig having n inner spaces.

That is, the unit stacking device according to the current embodiment includes n inner spaces arrayed and increasing in size upward from the second inner space of the stack jig of the previous embodiment and communicating with one another, and n radical units having sizes corresponding to the n inner spaces are stacked sequentially from the smallest one thereof to the greatest one thereof in the n inner spaces after the first and second radical units of the previous embodiment are stacked.

For example, referring to FIG. 14, a unit stacking device for a secondary battery according to the current embodiment includes a stack jig 230' that has a third inner space 234 disposed above the second inner space 232 and greater than the second inner space 232, and a third radical unit 130 having a size corresponding to the third inner space 234 is manufactured.

The third radical unit 130 is placed in the third inner space 234 after first and second radical units 110' and 120' are stacked, to form a third-step stacked structure of the first to third radical units 110', 120', and 130 in the stack jig 230', and a fixing tape 240' is attached to the first to third radical units 110', 120', and 130 to manufacture an electrode assembly having the three-step stacked structure.

A stacking method using the unit stacking device configured as described above according to the current embodiment is the same as the stacking method of the previous embodiment, except that the n radical units having sizes corresponding to the n inner spaces of the stack jig 230' are further manufactured and are stacked sequentially from the smallest one thereof to the greatest one thereof in the n inner spaces after the first and second radical units are stacked.

For example, referring to FIG. 14, the unit stacking device according to the current embodiment individually manufactures the first to third radical units 110', 120', and 130 having sizes corresponding to the first to third inner spaces 231, 232, and 234 of the stack jig 230'.

Then, the first to third radical units 110', 120', and 130 are sequentially stacked in the first to third inner spaces 231, 232, and 234 of the stack jig 230'.

After that, the fixing tape 240' is attached to the first to third radical units 110', 120', and 130 and connects an upper surface of the first to third radical units 110', 120', and 130 to a lower surface thereof, so as to manufacture the electrode assembly having a three-step stacked structure.

Although the unit stacking device and method for manufacturing the electrode assembly having a three-step stacked structure is exemplified, a unit stacking device and method for manufacturing an electrode assembly having a stacked structure of three or more steps may be exemplified and is also included in the scope of the present invention.

In addition, while the present invention has been particularly shown and described with reference to the foregoing embodiments thereof, the scope of the present invention should be defined by the following claims, and various changes and equivalents in form and details may be made therein without departing from the spirit and scope of the present invention as defined by the following claims.

The invention claimed is:

1. A method of stacking units for a secondary battery, comprising:
   individually manufacturing one or more first radical units having a first size and one or more second radical units having a second size greater than the first size; and
   classifying the first and second radical units according to sizes thereof, then, stacking the first and second radical units, and then, aligning the first and second radical units; and
   stacking the first and second radical units by inserting the first and second radical units into a stack jig,
   wherein the stack jig includes a first inner space having a size corresponding to the first size and a second inner space disposed above the first inner space and communicating with the first inner space and having a size corresponding to the second size, and
   the first radical units are stacked in the first inner space through the second inner space, and then, the second radical units are stacked in the second inner space.

2. The method of claim 1, wherein the first and second radical units are aligned by supporting a side surface of the first and second radical units or two neighboring surfaces of the first and second radical units against a fixing body, and then, pressing side surfaces of the first and second radical units, except for the surfaces supported against the fixing body, by using a pressing body.

3. The method of claim 1, further comprising transferring the first and second radical units aligned according to the sizes thereof, to the stack jig.

4. The method of claim 1, wherein a side inner surface of the first inner space is vertically extended from a side inner surface of the second inner space.

5. The method of claim 1, further comprising attaching a fixing tape to the first and second radical units stacked in the stack jig, through a cut hole disposed in a side surface of the stack jig and cut from an upper surface of the stack jig to a lower surface thereof in a height direction thereof.

6. The method of claim 1, wherein the stack jig further includes n inner spaces arrayed and increasing in size upward from the second inner space and communicating with one another, and
   n radical units having sizes corresponding to the n inner spaces are manufactured in the manufacturing of the first and second radical units, and
   the n radical units are stacked sequentially from the smallest one thereof to the greatest one thereof in the n inner spaces after the first and second radical units are stacked.

7. A unit stacking device for a secondary battery, which stacks one or more first radical units having a first size and one or more second radical units having a second size greater than the first size and comprises:
   a radical unit aligning part which classifies the first and second radical units according to sizes thereof, then, stacks the first and second radical units, and then, aligns the first and second radical units; and
   a stack jig, which includes a first inner space having a size corresponding to the first size and a second inner space disposed above the first inner space and communicating with the first inner space and having a size corresponding to the second size,
   wherein the first radical units are stacked in the first inner space through the second inner space, and then, the second radical units are stacked in the second inner space.

8. The unit stacking device of claim 7, wherein the radical unit aligning part includes: a fixing body which supports a side surface of the first and second radical units or two neighboring surfaces of the first and second radical units; and a pressing body which presses side surfaces of the first and second radical units, except for the surfaces supported by the fixing body.

9. The unit stacking device of claim 7, further comprising a radical unit transferring part which transfers the first and second radical units aligned according to the sizes thereof by the radical unit aligning part, to the stack jig.

10. The unit stacking device of claim 7, wherein a side inner surface of the first inner space is vertically extended from a side inner surface of the second inner space.

11. The unit stacking device of claim 7, wherein a cut hole is disposed in a side surface of the stack jig and is cut from an upper surface of the stack jig to a lower surface thereof in a height direction thereof to communicate with the first and second inner spaces.

12. The unit stacking device of claim 7, wherein the first and second radical units have a four-layer structure in which a first electrode, a first separator, a second electrode, and a second separator are sequentially stacked.

13. The unit stacking device of claim 12, wherein the first and second radical units are formed by adhering the first electrode, the first separator, the second electrode, and the second separator to one another.

14. The unit stacking device of claim 13, wherein the first electrode, the first separator, the second electrode, and the second separator are adhered to one another by pressing the first electrode, the first separator, the second electrode, and the second separator, or by pressing and heating the first electrode, the first separator, the second electrode, and the second separator.

15. The unit stacking device of claim 13, wherein surfaces of the first and second separators are coated with a coating material having adhesive force.

16. The unit stacking device of claim 15, wherein the coating material includes a mixture of inorganic particles and a binder polymer.

17. The unit stacking device of claim 12, wherein the first and second radical units are formed by repeatedly stacking the four-layer structure.

18. The unit stacking device of claim 7, wherein the stack jig further includes n inner spaces arrayed and increasing in size upward from the second inner space and communicating with one another, and
   n radical units having sizes corresponding to the n inner spaces are stacked sequentially from the smallest one thereof to the greatest one thereof in the n inner spaces after the first and second radical units are stacked.

* * * * *